Aug. 4, 1970 E. HENRY-BIABAUD 3,522,423
VEHICLE HEADLAMPS
Filed Sept. 6, 1966 3 Sheets-Sheet 3
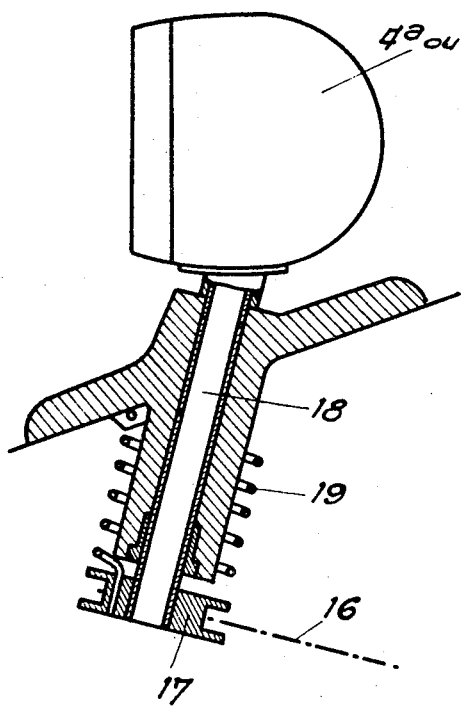
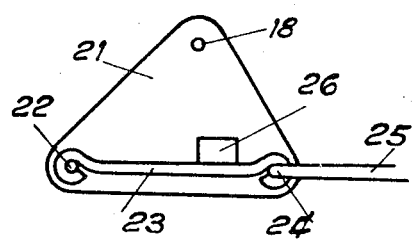
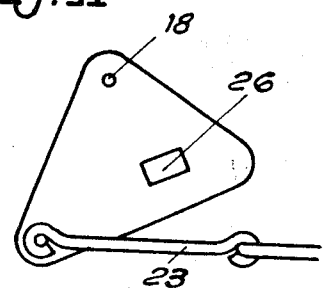
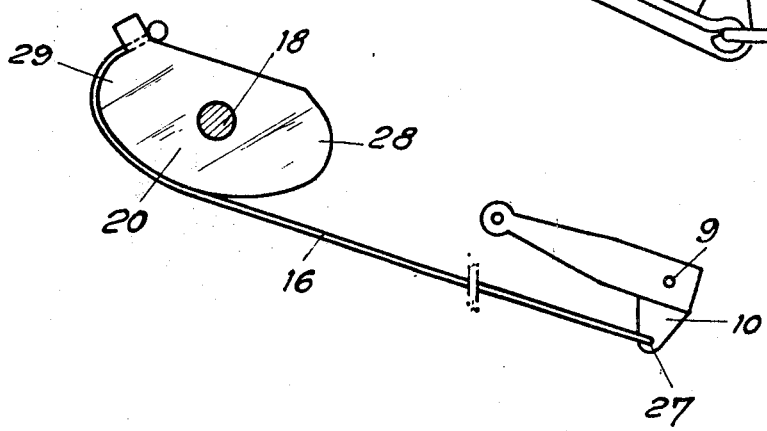

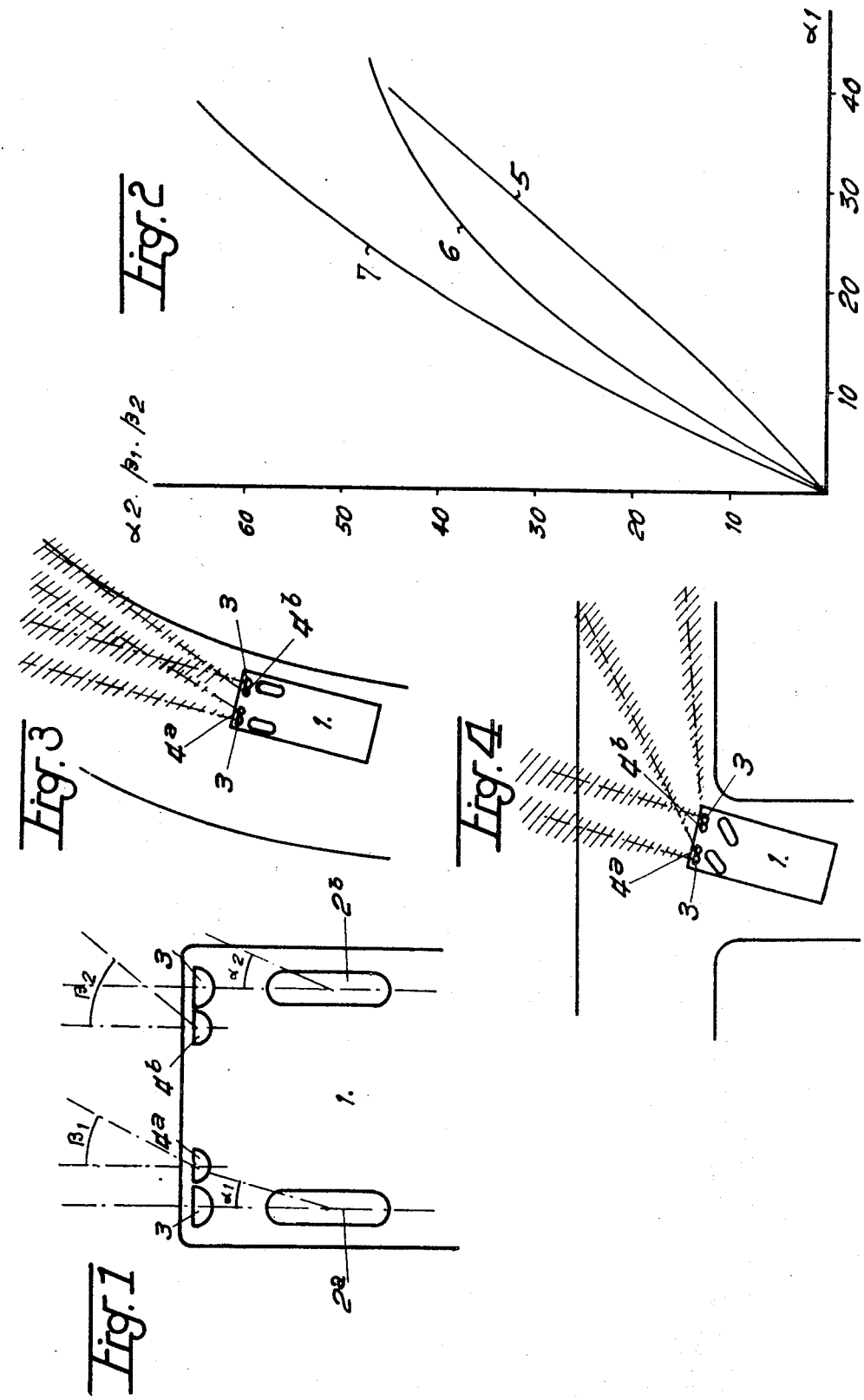

United States Patent Office 3,522,423
Patented Aug. 4, 1970

3,522,423
VEHICLE HEADLAMPS
Edmond Henry-Biabaud, Paris, France, assignor to Societe Anonyme Automobiles Citroen, Paris, France
Filed Sept. 6, 1966, Ser. No. 577,287
Claims priority, application France, Sept. 15, 1965, 3,224
Int. Cl. B60q 1/12
U.S. Cl. 240—8.25      4 Claims

ABSTRACT OF THE DISCLOSURE

Headlamps for a motor vehicle which adequately light the roadway even when the vehicle rounds a curve. In addition to a pair of stationary headlamps the vehicle is provided with a pair of headlamps which pivot toward the direction in which the vehicle is turned, the pivoted lamp toward the inside of the curve pivoting through a greater angle than the lamp on the outside.

---

This invention relates to vehicle headlamps.

When a road vehicle is travelling at low speed, using the regulation cruising lights, the illumination is sufficiently spread to give proper visibility. When, on the other hand, it is travelling with headlamps on, whether these be the normal low beam lamps or the high beam lights, which give good lighting when the vehicle is proceeding in a straight line at high speed, the beams are far more sharply focussed, so as to carry far enough ahead, but then prove inadequate on bends.

Many devices have been proposed for directing the headlamps on bends, so as to adequately light the roadway.

For example, in one known device the lamps are mounted to pivot in relation to the body of the vehicle and are linked to the steering mechanism in such a way that they turn in the same direction as the wheels and at an angle which is greater than that through which the wheels are turned. This angle increases faster at the beginning than at the end of the wheel deflection. However, this device, in which the headlamps remain parallel, does not afford the maximum illumination where it would be most useful.

The present invention relates to a road vehicle lighting device based on the same principle as is the device just described, but is improved in such a way as to be entirely satisfactory.

The distinguishing feature of the present device, in which swinging lamps are used in conjunction with fixed headlamps, is that the means by which the swinging lamps are linked to the track rods are such that the lamp on the "turn" side is swung through a wider angle than that through which the lamp on the other side swings and the difference between these two angles increases with the angle of turn of the wheels.

Various practical forms of lighting devices conforming to the invention are described hereunder, by way of example, in conjunction with the accompanying drawings, in which:

FIG. 1 is a diagrammatic plan of a motor vehicle fitted with lighting device here proposed;

FIG. 2 is a graph showing how the angles of pivotal movement of the head-lamps vary with the angle of turn of the wheels;

FIGS. 3 and 4 are schematic views which show respectively the illumination during a turn of large radius and during one of small radius, provided by a device conforming to the invention;

FIG. 8 is a vertical section showing a pivotal headlamp and its mounting;

FIG. 9 is a view in cross section showing how the motion can be imparted to the headlamp pivot pin; and FIGS. 10 to 12 show another embodiment of the device for imparting motion to the headlamp pivot pin.

Figure 5:
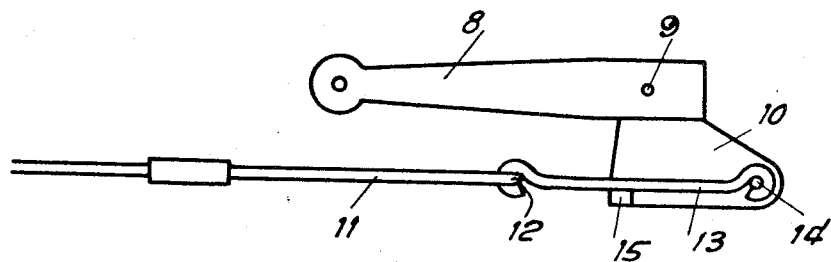
FIGS. 5 to 7 are views which show mechanism by which the headlamp movement can be derived from the steering mechanism.

In FIG. 1 a motor vehicle 1 is shown having two front wheels 2a and 2b. The vehicle 1 has two fixed conventional headlamps 3, and two pivotal lamps 4a and 4b, mounted so that they can be pivoted in relation to the vehicle body. As can be seen from FIG. 8, each of the lamps 4a and 4b have a pivot pin 18 which is inclined to the vertical and has its lower end pointing towards the front of the vehicle. The angle of inclination of the pivot pin 18 depends on the rolling flexibility of the vehicle.

During a turn, wheel 2a, in following the outer curve, turns through angle $\alpha_1$; wheel 2b on the inside of the curve, turns through angle $\alpha_2$, which, as is common knowledge, is larger, so that the turning circles of all four wheels are approximately on the same centre.

The lamps 4a and 4b are linked to the track-rod system in such a way as to pivot, in the same direction as the wheels, through angles $\beta_1$ and $\beta_2$, which are larger than $\alpha_1$ and $\alpha_2$. Moreover, the pivot angle $\beta_2$ of the headlamp on the side of the vehicle toward which the vehicle is turning, is larger than $\beta_1$, the pivot angle of the outer lamp.

The variations of angles $\beta_1$ and $\beta_2$, both with each other and with angles $\alpha_1$ and $\alpha_2$, are clearly shown in FIG. 2, in which 5, 6 and 7 are curves showing the variations in angles $\alpha_2$, $\beta_1$ and $\beta_2$ respectively, in relation to the angle, $\alpha_1$, through which wheel 2a, on the outside of the curve, is turned. It will be observed that curves 6 and 7 are approximately of the shape of sine-waves of different amplitudes.

On a moderate curve (FIG. 3), that is to say one such as is found on a highway or a suburban or country road, the two lamps 4a and 4b are approximately parallel, but they pivot further than the wheels are deflected. As can be seen from the drawing, the association of lamps 3, 4a and 4b enables the entire curve to be properly illuminated.

On a sharp bend, such as in mountainous country or when a driver is turning into a road at right angles, the inner lamp 4b is pivoted through almost a right angle, whereas the pivotal movement of outer lamp 4a barely exceeds 50° (FIG. 4). Here again, it can be seen from the drawing that the angular positions of the fixed and pivotal headlamps enables the bend to be adequately illuminated.

The means by which the steering mechanism is linked to the lamps 4 may be of any kind, provided only that the resulting variation between the pivot angle of the lamps and the turning angle of the wheels is approximately sinusoidal.

By way of example, the device has been shown as fitted on the right-hand side of the vehicle.

FIG. 5 shows a steering relay lever 8, pivoted at pivot pin 9 and fixed to an extension member in the form of a plate 10. A first elongated element in the form of a rod 11 connected to the appropriate headlamp 4a or 4b, that is to say to the right-hand lamp in the present instance, is articulated at 12 to a second elongated element in the form of an auxiliary rod 13, which is itself articulated at 14 to the plate 10, the pivot 12 being farther than the pivot 14 from the pivot pin 9. When the vehicle is travelling straight ahead, the rod 13 bears against a stop 15 on the plate 10.

When the vehicle is steered to the left (FIG. 6), the rod linkage is moved by the pivot 14; from the drawing it will be noted that the movement of this rod is more rapid at the beginning than at the end of the pivotal movement of the lever 8.

Figure 7:
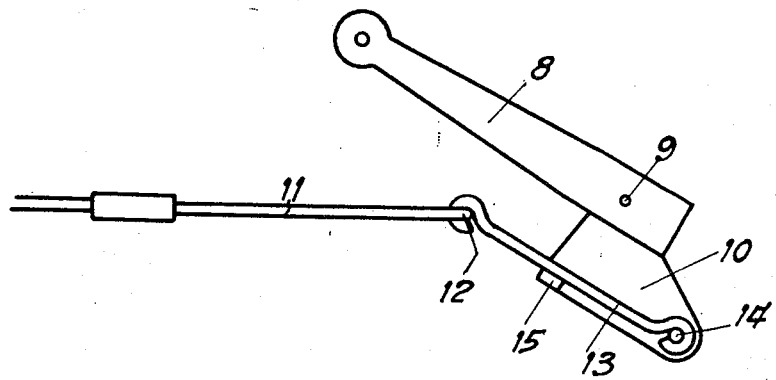

When the vehicle is steered to the right (FIG. 7), the auxiliary rod 13 is arrested by a stop 15, so that the pivot 12 is then immobilised in relation to the plate 10, the rod rod 11 being thrust away by the pivot 12. As in the case of the left-hand bend, movement is more rapid at the start than at the end; but as the distance between the pivots 9 and 12 is larger than between the pivots 9 and 14, the amplitude of the movement is larger.

The rod 11 is connected to a cable 16 (FIG. 8), wound round a pulley 17, which is fixed to the end of an inclined pivot pin 18 of the lamp 4b (or 4a, for the left-hand side); a restoring spring 19 exerts a force tending to rotate the pulley 17 in such a direction as to wind up the cable 16.

Alternatively, the plate 10 may be connected at 27 (FIG. 9) directly to the cable 16, which is then wound round a cam 20, fixed to the pivot pin 18, the vector radius of the cam increasing on each side of the midportion of the cam, this latter portion corresponding to rectilinear movement. The increase in vector radius is smaller at 28 than at 29, in order to obtain a larger amplitude of rotary motion for steering to the right than for steering to the left.

Figure 6:
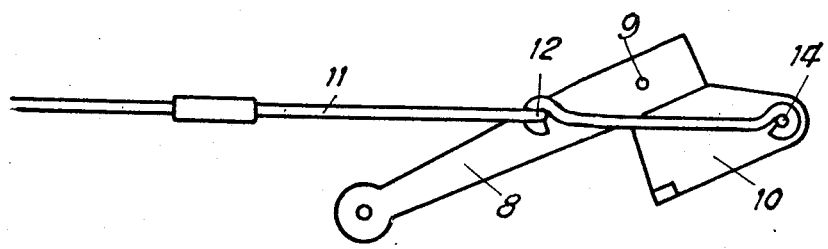

These two principles may be used in conjunction with each other, if desired; the rod 11 of the device shown in FIG. 6 being connected to the cable 16 wound round the cam 20.

It is also possible for a device similar to the one fitted to the steering relay lever 8 to be mounted on pivot pin 18 of the lamp, as shown in FIG. 10 to 12. In these figures, a lamp operating member in the form of a plate 21 is fixed to the pin 18. On this plate is pivoted, at pivot pin 22, a second elongated member in the form of an auxiliary rod 23, which is articulated at 24 to a first elongated member in the form of a rod 25 and, when the vehicle is moving in a straight line (FIG. 10), bears against a stop 26 on the plate 21. The rod 25 may simply be connected to the steering lever at 27, as is the cable 16 in FIG. 9, or else it may be articulated to the pivot 12 of the device illustrated in FIGS. 5 to 7.

When the vehicle is steered to the left, the active pivot is the pivot 22 (FIG. 11). When the vehicle is steered to the right, the auxiliary rod 23 bears against the stop 26 and the active pivot is the pivot 24, which is at a shorter distance from the pin 18 than is the pivot pin 22 (FIG. 12).

The invention should not be regarded as limited to the practical example here described and illustrated, but includes all modifications thereof. Thus, in particular, other means, which may be hydraulic or pneumatic, for example, may be provided for linking the steering to headlamp 4a or 4b.

I claim:
1. A road vehicle headlamp arrangement comprising:
   a pair of headlamps arranged to be fixed relatively to a vehicle body,
   a pair of laterally spaced pivotal headlamps arranged to pivot relatively to a vehicle body, and
   linkage means arranged to connect the pivotal headlamps to the vehicle steering mechanism whereby the pivotal headlamp on the inside of a given turn is caused to pivot through a larger angle than the pivotal headlamp on the outside of a given turn, said linkage means comprising:
       a pivotally supported steering relay lever having an extension member fixed thereto,
       a first elongated element operatively connected to said pivotal headlamps,
       a second elongated element pivotally connected to said first elongated element and to said extension member, and
       a stop on said extension member by which pivotal movement of the second element is limited in one direction of movement in relation to the lever,
       the distance between the lever supporting pivot and the pivot at which said first element is connected to said second element differing from the distance between said lever supporting pivot and the pivot at which said second element is connected to said lever.

2. An arrangement as defined in claim 1, wherein each of said pivotal headlamps is pivoted about an axis inclined downwardly and forwardly.

3. A road vehicle headlamp arrangement comprising:
   a pair of headlamps arranged to be fixed relatively to a vehicle body,
   a pair of laterally spaced pivotal headlamps arranged to pivot relatively to said vehicle body, and
   linkage means arranged to connect the pivotal headlamp to the vehicle steering mechanism whereby the pivotal headlamp on the inside of a given turn is caused to pivot through a larger angle than the pivotal headlamp on the outside of a given turn, said linkage means comprising:
       a steering relay lever, a cable, and
       a cam secured to said pivotal headlamp,
           one end of said cable being wound around said cam and the other end of said cable being secured to said relay lever.

4. A road vehicle headlamp arrangement comprising:
   a headlamp arranged to be fixed relatively to a vehicle body,
   a pivotal headlamp arranged to pivot relatively to said vehicle body, and
   means for linking said pivotal headlamp to the steering mechanism of the vehicle comprising:
       a pivotally supported lamp operating member secured to said pivotal headlamp,
       a first elongated element operatively connected to said steering mechanism,
       a second elongated element pivotally connected to said first elongated element and to said lamp operating member, and
       stop means on said operating member, said stop means acting to limit the movement of said second elongated element in one direction in relation to the said operating member,
       the distance between the lamp operating member pivot and the pivot at which said second elongated element is connected to said lamp operating member differing from the distance between said lamp operating member pivot and the pivot at which said first elongated element is connected to said second elongated element.

References Cited

UNITED STATES PATENTS

| 1,689,712 | 10/1928 | Barber et al. | 240—62.52 |
| 1,328,992 | 1/1920 | Harley | 240—61.7 |
| 1,511,247 | 10/1924 | Van Sicklen | 240—61.5 |
| 1,726,196 | 8/1929 | Smith | 240—61.7 |
| 1,704,046 | 3/1929 | Lespinat et al. | 240—8.25 |

NORTON ANSHER, Primary Examiner

R. M. SHEER, Assistant Examiner

U.S. Cl. X.R.
240—62.52